United States Patent [19]

Otsuka et al.

[11] 4,407,243

[45] Oct. 4, 1983

[54] AIR/FUEL RATIO CONTROL SYSTEM HAVING FUNCTION OF CONTROLLING SUPPLY OF SECONDARY AIR INTO INTAKE PIPE OF INTERNAL COMBUSTION ENGINE

[75] Inventors: Kazuo Otsuka, Higashikurume; Shin Narasaka, Yono; Shumpei Hasegawa, Niiza, all of Japan

[73] Assignee: Honda Motor Co., Ltd., Tokyo, Japan

[21] Appl. No.: 294,464

[22] Filed: Aug. 20, 1981

[30] Foreign Application Priority Data

Aug. 27, 1980 [JP] Japan ................. 55-118879

[51] Int. Cl.³ .................... F02B 3/00; F02B 33/00
[52] U.S. Cl. ................... 123/179 G; 123/440; 123/585; 123/587; 123/327
[58] Field of Search .......... 123/440, 585, 587, 179 B, 123/179 BG, 179 G, 327

[56] References Cited

U.S. PATENT DOCUMENTS

| | | | |
|---|---|---|---|
| 3,866,588 | 2/1975 | Nakada | 123/587 |
| 4,194,477 | 3/1980 | Sugiyami | 123/587 |
| 4,250,707 | 2/1981 | Cavallino | 123/587 |
| 4,279,230 | 7/1981 | Bauer | 123/440 |
| 4,300,501 | 11/1981 | Suzuki | 123/585 |

FOREIGN PATENT DOCUMENTS 53-86924 7/1978 Japan ................. 123/440

*Primary Examiner*—Ronald B. Cox
*Attorney, Agent, or Firm*—Arthur L. Lessler

[57] ABSTRACT

An air/fuel ratio control system for performing feedback control of the air/fuel ratio of an air/fuel mixture being supplied to an internal combustion engine in response to the concentration of an exhaust gas ingredient. The air/fuel ratio control system includes a device for controlling a shot air valve for supplying secondary air into the intake pipe of the engine. The control device is connected to a solenoid valve for controlling the shot air valve and operable to open the solenoid valve to hold the shot air valve inoperative for a predetermined period of time after the engine rpm has increased across a predetermined value which is higher than the engine cranking rpm but lower than the engine idling rpm, to thereby prevent misfire within engine cylinders at the start of the engine.

2 Claims, 5 Drawing Figures

AIR/FUEL RATIO CONTROL SYSTEM HAVING FUNCTION OF CONTROLLING SUPPLY OF SECONDARY AIR INTO INTAKE PIPE OF INTERNAL COMBUSTION ENGINE

BACKGROUND OF THE INVENTION

This invention relates to an air/fuel ratio control system for performing feedback control of the air/fuel ratio of an air/fuel mixture being supplied to an internal combustion engine, and more particularly to a secondary air control device for controlling a shot air valve which is adapted to allow temporary supply of atmospheric air into the intake pipe of the engine to reduce the concentration of a too rich mixture in the intake pipe when there occurs a sudden increase in the negative pressure in the intake pipe.

An air/fuel ratio control system for performing the air/fuel ratio of an air/fuel mixture being supplied to an internal combustion engine having an intake pipe has already been proposed by the assignee of the present application, which comprises means for detecting the concentration of an exhaust gas ingredient emitted from the engine, fuel quantity adjusting means for producing the air/fuel mixture being supplied to the engine, and an electrical circuit operatively connecting the concentration detecting means with the fuel quantity adjusting means in a manner effecting feedback control operation to control the air/fuel ratio of the mixture to a predetermined value in response to an output signal produced by the concentration detecting means.

On the other hand, a shot air valve is generally used, whhich is adapted to allow temporary supply of atmospheric air into the intake pipe of the engine upon a sudden increase in the suction negative pressure in the intake pipe which is caused, for instance, by a sudden change in the throttle valve position from its full opening position to its full closing position, to make leaner the mixture being supplied to the engine, which is then too rich due to the suddenly increased negative pressure, to thereby prevent explosive combustion of unburned fuel within the exhaust system of the engine.

However, even at the start of the engine, this shot air valve is actuated due to a sudden increase in the suction negative pressure in the intake pipe at the start of the engine so that the suction mixture is temporarily diluted, which can cause misfire in engine cylinders.

OBJECT AND SUMMARY OF THE INVENTION

It is the object of the invention to provide an air/fuel ratio control system which is provided with a shot air valve control device which is operable to temporarily hold the shot air valve inoperative at the start of the engine, while allowing the same valve to be ready to normally operate when the engine is in an operating condition other than that at the start of the engine.

According to the invention, there is provided an air/fuel ratio control system for performing feedback control of the air/fuel ratio of an air/fuel mixture being supplied to an internal combustion engine having an intake pipe, which comprises means for detecting the concentration of an exhaust gas ingredient emitted from the engine, fuel quantity adjusting means for producing the mixture being supplied to the engine, and an electrical circuit operatively connecting the concentration detecting means with the fuel quantity adjusting means in a manner effecting feedback control operation to control the air/fuel ratio of the mixture to a predetermined value in response to an output signal produced by the concentration detecting means. The electrical circuit includes a circuit for detecting the operating condition of the engine. The air/fuel ratio control system is characterized by comprising in combination: a secondary air supply passage communicating the intake pipe of the engine with atmospheric air; a secondary air control valve arranged across the secondary air supply passage and having a diaphragm defining a negative pressure chamber on one side thereof and a control chamber on an opposite side thereof; orifice means communicating the negative pressure chamber with the control chamber, said secondary air control valve being responsive to negative pressure introduced into said negative pressure chamber to open said secondary air supply passage; a check valve arranged to allow movement of air only from the negative pressure chamber to the control chamber; a negative pressure passage communicating the negative pressure chamber with the intake pipe of the engine; a control passage communicating the control chamber with the intake pipe; a solenoid valve arranged to close the control passage; a sensor for detecting the rotational speed of the engine; and means for controlling the solenoid valve in response to an output signal produced by the engine rotational speed sensor. The solenoid valve control means includes the above-mentioned engine operating condition detecting circuit which is arranged to be supplied with the output signal of the engine rotational speed sensor for control of the air/fuel ratio of the mixture. The solenoid valve control means is operable to open the solenoid valve for a predetermined period of time after the engine rotational speed has increased across a predetermined value which is higher than the engine cranking rpm but lower than the engine idling rpm.

The above and other objects, features and advantages of the invention will be more apparent from the ensuing detailed description taken in connection with the accompanying drawings in which:

DETAILED DESCRIPTION

The air/fuel ratio control system according to the invention will now be described in detail with reference to the accompanying drawings wherein an embodiment of the invention is illustrated.

Figure 1:
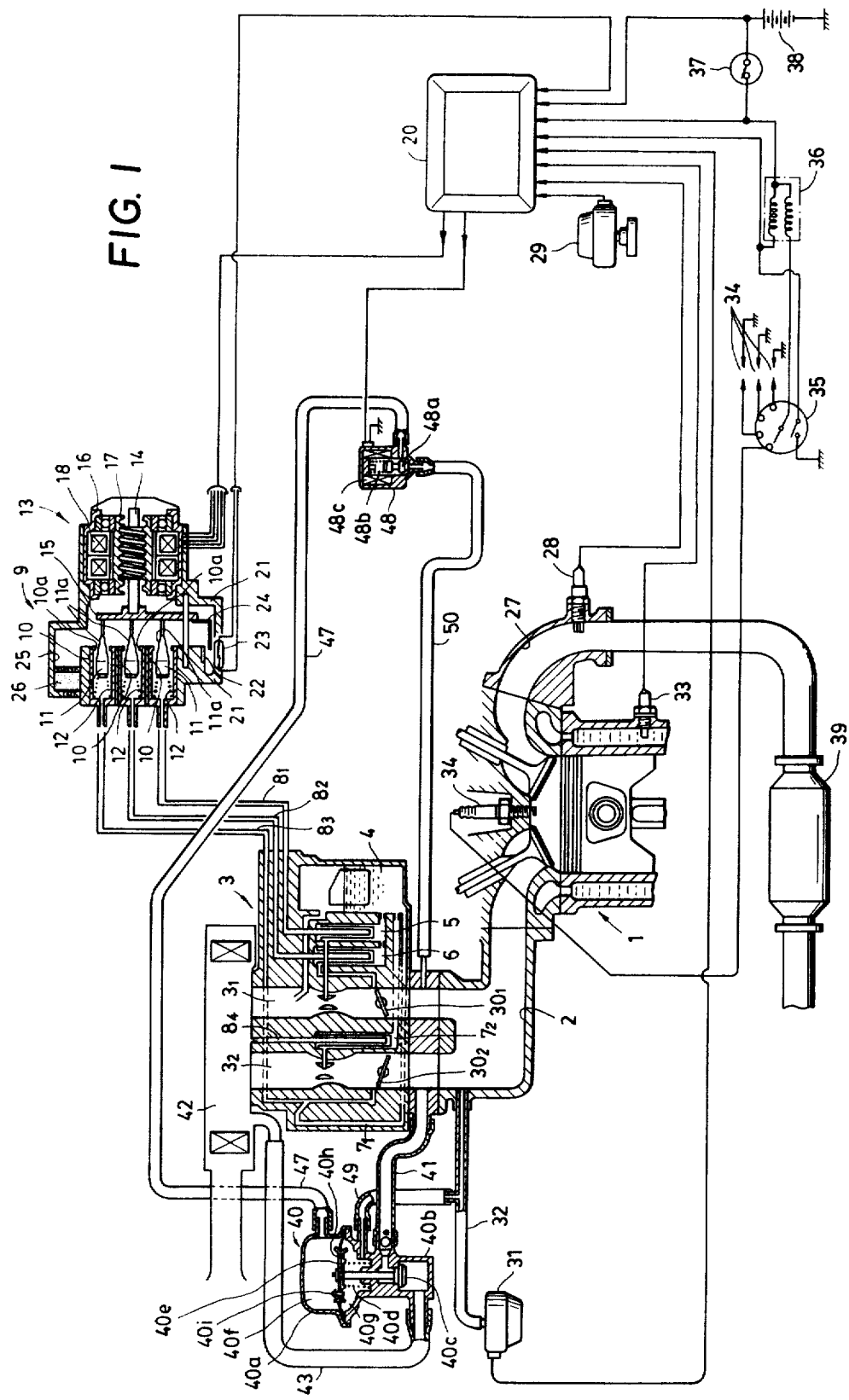
FIG. 1 is a diagrammatic view illustrating the whole arrangement of an air/fuel ratio control system according to the invention.

Referring now to FIG. 1, there is illustrated the whole system of the invention. Reference numeral 1 designates an internal combustion engine. Connected to the engine 1 is an intake manifold 2 which is provided with a carburetor generally designated by the numeral 3. The carburetor 3 has fuel passages 5, 6 which communicate a float chamber 4 with the primary bore $3_1$ of the carburetor 3. These fuel passages 5, 6 are connected to an air/fuel ratio control valve generally designated by the numeral 9, via air bleed passages $8_1$, $8_2$. The carburetor 3 also has fuel passages $7_1$, $7_2$ communicating the float chamber 4 with the secondary bore $3_2$ of the carburetor 3. The fuel passage $7_1$, on one hand, is connected to the above air/fuel ratio control valve 9 via an air passage $8_3$ and, on the other hand, opens in the secondary bore $3_2$ at a location slightly upstream of a throttle valve $30_2$ in the secondary bore. The fuel passage $7_2$ communicates with the interior of an air cleaner 42 via an air passage $8_4$ having a fixed orifice. The control valve 9 is comprised of three flow rate control valves, each of which is formed of a cylinder 10, a valve body 11 displaceably inserted into the cylinder 10, and a coil spring 12 interposed between the cylinder 10 and the valve body 11 for urging the valve body 11 in a predetermined direction. Each valve body 11 is tapered along its end portion 11a remote from the coil spring 12 so that the effective opening area of the opening 10a of each cylinder 10, in which the tapered portion 11a of the valve body is inserted, varies as the valve body 11 is moved. Each valve body 11 is disposed in urging contact with a connection plate 15 coupled to a worm element 14 which is axially movable but not rotatable about its own axis. The worm element 14 is in threaded engagement with the rotor 17 of a pulse motor 13 which is arranged about the element 14 and rotatably supported by radial bearings 16. Arranged about the rotor 17 is a solenoid 18 which is electrically connected to an electronic control unit (hereinafter called "ECU") 20. The solenoid 18 is energized by driving pulses supplied from ECU 20 to cause rotation of the rotor 17 which in turn causes movement of the worm element 13 threadedly engaging the rotor 17 in the leftward and rightward directions as viewed in FIG. 1. Accordingly, the connection plate 15 coupled to the worm element 14 is moved leftward and rightward in unison with the movement of the worm element 14.

The pulse motor 13 has its stationary housing 21 provided with a permanent magnet 22 and a reed switch 23 arranged opposite to each other. The plate 15 is provided at its peripheral edge with a magnetic shielding plate 24 formed of a magnetic material which is interposed between the permanent magnet 22 and the reed switch 23 for movement into and out of the gap between the two members 22, 23. The magnetic shielding plate 24 is displaced in the leftward and rightward directions in unison with displacement of the plate 15 in the corresponding directions. The reed switch 23 turns on or off in response to the displacement of the plate 24. That is, when the valve body 11 of the air/fuel ratio control valve 9 passes a reference position which is determined by the positions of the permanent magnet 22, reed switch 23 and magnetic shielding plate 24, the reed switch 23 turns on or off depending upon the moving direction of the valve body 11, to supply a corresponding binary output signal to ECU 20.

Incidentally, the pulse motor housing 21 is formed with an air intake 25 communicating with the atmosphere. Air is introduced through a filter 26 mounted in the air intake 25, into each flow rate control valve in the housing 21.

On the other hand, an $O_2$ sensor 28, which is made of stabilized zirconium oxide or a like material, is inserted in the intake manifold 27 of the engine 1 in a manner partly projected into the manifold 27. The $O_2$ sensor 28 is electrically connected to ECU 20 to supply its output thereto. An atmospheric pressure sensor 29 is provided to detect ambient atmospheric pressure surrounding the vehicle, not shown, in which the engine 1 is installed. This sensor 29 is also electrically connected to ECU 20 to supply its output thereto.

Reference numeral 40 designates a shot air valve (secondary air control valve). The casing 40a of the valve 40 has a lower chamber 40b which is, on one hand, connected to a conduit 41 opening in the secondary bore $3_2$ of the intake manifold 2 at a location downstream of the throttle valve $30_2$, and, on the other hand, connected to a conduit 43 communicating with the air cleaner 42 situated on the upstream side of the venturi section. The conduits 41 and 43 form a secondary air supply passage. A valve body 40c is arranged within the lower chamber 40b for interrupting the communication between the conduits 41, 43. The casing 40a has an upper chamber divided in an upper control chamber 40f and a lower negative pressure chamber 40g by means of a diaphragm 40e connected to the valve body 40c and urged by a coil spring 40d. The diaphragm 40e is provided with an orifice 40h and a check valve 40i. The check valve 40i is adapted to allow only movement of air from the chamber 40g to the chamber 40f. The control chamber 40f communicates with a shot air cut valve 48 by way of a conduit 47, and the negative pressure chamber 40g with the intake manifold 2 by way of conduits 49, 32 which cooperate to form a negative pressure passage, respectively. The shot air valve 40 is adapted to operate such that when there occurs a sudden increase in the suction negative pressure within the intake manifold 2 which can be caused, for instance, by a sudden change in the throttle valve position from its full opening position to its full closing position, the diaphragm 40e is downwardly displaced to downwardly displace the valve body 40c for fresh air to be temporarily supplied into the intake manifold 2 through the conduits 43, 41 to make leaner the mixture being supplied to the engine, which is then too rich, to thereby prevent misfire within engine cylinders as well as explosive combustion of unburned fuel within the exhaust system of the engine. Incidentally, during operation of the shot air valve 40, negative pressure is transmitted little by little through the orifice 40h from the negative pressure chamber 40g to the control chamber 40f so that the diaphragm 40e is returned into its original position by the force of the spring 40d shortly after its deformation. The check valve 40i is operable to allow air to rapidly escape therethrough from the negative pressure chamber 40g to the control chamber 40f when the pressure within the negative pressure chamber 40g exceeds that within the control chamber 40f, and have its valve body immediately returned to its original closed position as soon as the differential pressure between the chambers 40f, 40g has decreased to a certain level, to thereby enable the shot air valve 40 to properly operate during subsequent deceleration of the engine.

The shot air cut valve 48 communicates with a zone in the primary bore $3_1$ downstream of the throttle valve $30_1$, by way of a conduit 50 which cooperates with the conduit 47 to form a control passage. This valve 48 is comprised of a valve body 48a arranged so as to interrupt the communication between the conduit 47 and the conduit 50, a coil spring 48b arranged to urge the valve body 48a in its closing direction, and a solenoid 48c arranged to be energized by a control signal from ECU 20. This valve 48 is a normally closed type and is responsive to a command from ECU 20 at the start of the engine, to have its solenoid 48c energized and accordingly its valve body 48a displaced into its open position to introduce negative pressure from the intake manifold 2 to the control chamber 40f of the shot air valve 40 to make zero the differential pressure between the chambers 40f, 40g, rendering the shot air valve 40 inoperative. Thus, misfire within the engine cylinders can be avoided, which would otherwise be caused by temporary dilution of a suction mixture due to the operation of the shot air valve at the start of the engine.

Incidentally, in FIG. 1, reference numeral 39 designates a three-way catalyst for purifying CO, HC and NOx present in the engine exhaust gases, 31 a pressure sensor arranged to detect the absolute pressure in the intake manifold 2 at a zone downstream of the throttle valves $30_1$, $30_2$ through a conduit 32, the sensor 31 being electrically connected to ECU 20 to supply its output thereto, and 33 a thermistor partly inserted in the peripheral wall of the engine cylinder, the interior of which is filled with engine cooling water, to detect the temperature of the cooling water as an engine temperature, the sensor 33 being also electrically connected to ECU 20 to supply its output thereto, respectively. Reference numeral 34 denotes an ignition plug embedded in the cylinder head of the engine 1 with its tip projected in the combustion chamber, 35 a distributor, 36 an ignition coil, 37 an ignition switch and 38 a battery, respectively. The distributor 35 has a drive shaft, not shown, arranged to be rotated at speeds proportional to the engine rpm so that the ignition coil 36 produces pulses corresponding in frequency to switching of the contact point of the distributor 35 or an output signal produced by a contactless pickup alternatively provided. The ignition coil 36 is electrically connected to ECU 20 to supply its output pulses thereto. Thus, the distributor 35 and the ignition coil 36 also serve as an engine rpm sensor in the illustrated embodiment.

Details of the air/fuel ratio control which can be performed by the air/fuel ratio feedback control system of the invention described above will now be described with reference to FIG. 1 which has been referred to hereinabove.

Initialization

Referring first to the initialization, when the ignition switch 37 in FIG. 1 is set on at the start of the engine, ECU 20 is initialized to detect the reference position of the actuator or pulse motor 13 by means of the reed switch 23 and hence drive the pulse motor 13 to set it to its best position (a preset position) for starting the engine, that is, set the initial air/fuel ratio to a predetermined proper value. The above preset position of the pulse motor 13 is hereinafter called "$PS_{CR}$". This setting of the engine rpm Ne is lower than a predetermined value $N_{CR}$ (e.g., 400 rpm) and the engine is in a condition before firing. The predetermined value $N_{CR}$ is set at a value higher than the cranking rpm and lower than the idling rpm.

The above reference position of the pulse motor 13 is detected as the position at which the reed switch 23 turns on or off, as previously mentioned with reference to FIG. 1.

Then, ECU 20 monitors the condition of activation of the $O_2$ sensor 28 and the coolant temperture Tw detected by the thermistor 33 to determine whether or not the engine is in a condition for initiation of the air/fuel ratio control. For accurate air/fuel ratio feedback control, it is a requisite that the $O_2$ sensor 28 is fully activated and the engine is in a warmed-up condition. The $O_2$ sensor 28, which is made of stabilized zirconium dioxide or the like, has a characteristic that its internal resistance decreases as its temperature increases. If the $O_2$ sensor is supplied with electric current through a resistance having a suitable resistance value from a constant-voltage regulated power supply provided within ECU 20, the electrical potential or output voltage of the sensor initially shows a value close to the power supply voltage (e.g., 5 volts) when the sensor is not activated, and then, its electrical potential lowers with the increase of its temperature. Therefore, according to the invention, the air/fuel ratio feedback control is not initiated until after the conditions have been fulfilled that the sensor produces an activation signal when its output voltage lowers down to a predetermined voltage Vx, a timer finishes counting for a predetermined period of time $t_x$ (e.g., 1 minute) starting from the occurrence of the above activation signal, and the coolant temperature Tw increases up to a predetermined value Twx at which the automatic choke is opened to an opening for enabling the air/fuel ratio feedback control.

During the above stage of the detection of activation of the $O_2$ sensor and the coolant temperature Tw, the pulse motor 13 is held at its predetermined position $PS_{CR}$. The pulse motor 13 is driven to appropriate positions in response to the operating condition of the engine after initiation of the air/fuel ratio control, as hereinafter described.

Basic Air/Fuel Ratio Control

Following the initialization, the program proceeds to the basic air/fuel ratio control.

ECU 20 is responsive to various detected value signals representing the output voltage of the $O_2$ sensor 28, the absolute pressure in the intake manifold 2 detected by the pressure sensor 31, the engine rpm Ne detected by the rpm sensor 35, 36, and the atmospheric pressure $P_A$ detected by the atmospheric pressure sensor 29, to drive the pulse motor 13 as a function of these signals to control the air/fuel ratio. More specifically, the basic air/fuel ratio control comprises open loop control which is carried out at wide-open-throttle, at engine idle, and at engine deceleration, and closed loop control which is carried out at engine partial load. All the control is initiated after completion of the warming-up of the engine.

First, the condition of open loop cntrol at wide-open-throttle is met when the differential pressure $P_A - P_B$ (gauge pressure) between the absolute pressure $P_B$ detected by the pressure sensor 31 and the atmospheric pressure $P_A$ (absolute pressure) detected by the atmospheric pressure sensor 29 is lower than a predetermined value $\Delta P_{WOT}$. ECU 20 compares the difference in value between the output signals of the sensors 29, 31 with the predetermined value $\Delta P_{WOT}$ stored therein, and when the relationship of $P_A - P_B < \Delta P_{WOT}$ stands, drives the pulse motor 13 to a predetermined position (preset position) $PS_{WOT}$ and holds it there, which is a position best appropriate for the engine emissions to be obtained at the time of termination of the wide-open-throttle open loop control. At wide-open-throttle, a known economizer, not shown, or the like is actuated to supply a rich or small air/fuel ratio mixture to the engine.

The condition of open loop control at engine idle is met when the engine rpm Ne is lower than a predetermined idle rpm $N_{IDL}$ (e.g., 1,000 rpm). ECU 20 compares the output signal value Ne of the rpm sensor 35, 36 with the predetermined rpm $N_{IDL}$ stored therein, and when the relationship of $Ne<N_{IDL}$ stands, drives the pulse motor 13 to a predetermined idle position (preset position) $PS_{IDL}$ which is best suitable for the engine emissions and holds it there.

The above predetermined idle rpm $N_{IDL}$ is set at a value slightly higher than the actual idle rpm to which the engine concerned is adjusted.

The condition of open loop control at engine deceleration is fulfilled when the absolute pressure $P_B$ in the intake manifold is lower than a predetermined value $PB_{DEC}$. ECU 20 compares the output signal value $P_B$ of the pressure sensor 31 with the predetermined value $PB_{DEC}$ stored therein, and when the relationship of $P_B<PB_{DEC}$ stands, drives the pulse motor 13 to a predetermined deceleration position (preset position) $PS_{DEC}$ best suitable for the engine emissions and holds it there.

The ground for this condition of open loop control at engine deceleration lies in that when the absolute pressure $P_B$ in the intake manifold drops below the predetermined value, unburned HC is produced at an increased rate in the exhaust gases, to make it impossible to carry out the air/fuel ratio feedback control based upon the detected value signal of the $O_2$ sensor with accuracy, thus failing to control the air/fuel ratio to a theoretical value. Therefore, according to the invention, the open loop control is employed, as noted above, when the absolute pressure $P_B$ in the intake manifold detected by the pressure sensor 31 is smaller than the predetermined value $PB_{DEC}$, where the pulse motor is set to the predetermined position $PS_{DEC}$ best suitable for the engine emissions obtained at the time of termination of the deceleration open loop control.

During operations of the above-mentioned open loop control at wide-open-throttle, at engine idle, at engine deceleration, the respective predetermined positions $PS_{WOT}$, $PS_{IDL}$, $PS_{DEC}$ for the pulse motor 13 are compensated for atmospheric pressure $P_A$, as hereinlater described.

On the other hand, the condition of closed loop control at engine partial load is met when the engine is in an operating condition other than the above-mentioned open loop control conditions. During the closed loop control, ECU 20 performs selectively feedback control based upon proportional term correction (hereinafter called "P term control") and feedback control based upon integral term correction (hereinafter called "I term control"), in response to the engine rpm Ne detected by the engine rpm sensor 35, 36 and the output signal of the $O_2$ sensor 28. To be concrete, the integral term correction is used when the output voltage of the $O_2$ sensor 28 varies only at the higher level side or only at the lower level side with respect to a reference voltage Vref, wherein the position of the pulse motor 13 is corrected by an integral value obtained by integrating the value of a binary signal which changes in dependence on whether the output voltage of the $O_2$ sensor is at the higher level or at the lower level with respect to the predetermined reference voltage Vref, to thereby achieve stable and accurate position control of the pulse motor 13. On the other hand, when the output signal of the $O_2$ sensor changes from the higher level to the lower level or vice versa, the proportional term correction is carried out wherein the position of the pulse motor 13 is corrected by a value directly proportional to a change in the output voltage of the $O_2$ sensor to thereby achieve air/fuel ratio control in a manner prompter and more efficient than the integral term correction.

As noted above, according to the above I term control, the pulse motor position is varied by an integral value obtained by integrating the value of a binary signal corresponding to the change of the output voltage of the $O_2$ sensor. According to this I term control, the number of steps by which the pulse motor is to be displaced per second differs depending upon the speed at which the engine is then operating. That is, in a low engine rpm range, the number of steps by which the pulse motor is to be displaced is small. With an increase in the engine rpm, the above number of steps increases so that it is large in a high engine rpm range.

Whilst, according to the P term control which, as noted above, is used when there is a change in the output voltage of the $O_2$ sensor from the higher level to the lower one or vice versa with respect to the reference voltage Vref, the number of steps by which the pulse motor is to be displaced per second is set at a single predetermined value (e.g., 6 steps), irrespective of the engine rpm.

The air/fuel ratio control at engine acceleration (i.e., off-idle acceleration) is carried out when the engine rpm Ne exceeds the aforementioned predetermined idle rpm $N_{IDL}$ (e.g., 1,000 rpm) during the course of the engine speed increasing from a low rpm range to a high rpm range, that is, when the engine speed changes from a relationship $Ne<N_{IDL}$ to one $Ne\geq N_{IDL}$. On this occasion, ECU 20 rapidly moves the pulse motor 13 to a predetermined acceleration position (preset position) $PS_{ACC}$, and thereafter initiates the aforementioned air/fuel ratio feedback control. This predetermined position $PS_{ACC}$ is compensated for atmospheric pressure $P_A$, too, as hereinlater described.

The above-mentioned predetermined position $PS_{ACC}$ is set at a position where the amount of detrimental ingredients in the exhaust gases is small. Therefore, particularly at the so-called "standing start," i.e., acceleration from a vehicle-stopping position, setting the pulse motor position to the predetermined position $PS_{ACC}$ is advantageous to antiexhaust measures, as well as to achievement of accurate air/fuel ratio feedback control to be done following the acceleration. This acceleration control is carried out under a warmed-up engine condition, too. By thus setting the pulse motor to the preset position $PS_{ACC}$ at the standing start of the engine, it is feasible to reduce the amount of detrimental ingredients in the engine exhaust gases to be produced at the standing start. Further, this setting of the pulse motor position automatically determines the initial air/fuel ratio to be applied at the start of air/fuel ratio feedback control immediately following this standing start to thereby facilitate control of the air/fuel ratio to an optimum value for the emission characteristics and driveability of the engine at the start of air/fuel ratio feedback control.

Particularly, the above manner of control at engine acceleration enables a large reduction in the total amount of detrimental ingredients in the exhaust gases to be produced during transition from the standing start to the immediately following air/fuel ratio feedback operation, thus being advantageous to the anti-pollution measures.

In transition from the above-mentioned various open loop control to the closed loop control at engine partial load or vice versa, changeover between open loop mode and closed loop mode is effected in the following manner: First, in changing from closed loop mode to open loop mode, ECU 20 moves the pulse motor 13 to an atmospheric pressure-compensated predetermined position PSi($P_A$) in a manner referred to later, irrespective of the position at which the pulse motor was located immediately before entering the open loop control. This predetermined position PSi($P_A$) includes preset positions $PS_{CR}$, $PS_{WOT}$, $PS_{IDL}$, $PS_{DEC}$ and $PS_{ACC}$, each of which is corrected in response to actual atmospheric pressure as hereinlater referred to. Various open loop control operations can be promptly done, simply by setting the pulse motor to the above-mentioned respective predetermined positions.

On the other hand, in changing from open loop mode to closed loop mode, ECU 20 commands the pulse motor 13 to initiate air/fuel ratio feedback control with I term correction. That is, there can be a difference in timing between the change of the output signal level of the $O_2$ sensor from the high level to the low level or vice versa and the change from the open loop mode to the closed loop mode. In such an event, the deviation of the pulse motor position from the proper position upon entering the closed loop mode, which is due to such timing difference, is much smaller in the case of initiating air/fuel ratio control with I term correction than that in the case of initiating it with P term correction, to make it possible to resume early accurate air/fuel ratio control and accordingly ensure highly stable engine exhaust emission characteristics.

To obtain optimum exhaust emission characteristics irrespective of changes in the actual atmospheric pressure during open loop air/fuel ratio control or at the time of shifting from open loop mode to closed loop mode, the position of the pulse motor 13 needs to be compensated for atmospheric pressure, as previously mentioned. According to the invention, the above-mentioned predetermined or preset positions $PS_{CR}$, $PS_{WOT}$, $PS_{IDL}$, $PS_{DEC}$, $PS_{ACC}$ at which the pulse motor 13 is to be held during the respective open loop control operations are corrected in a linear manner as a function of changes in the atmospheric pressure $P_A$, using the following equation:

$$PSi(P_A) = PSi + (760 - P_A) \times CI$$

where i represents any one of CR, WOT, IDL, DEC and ACC, accordingly PSi represents any one of $PS_{CR}$, $PS_{WOT}$, $PS_{IDL}$, $PS_{DEC}$ and $PS_{ACC}$ at 1 atmospheric pressure (=760 mmHg), and Ci a correction coefficient, representing any one of $C_{CR}$, $C_{WOT}$, $C_{IDL}$, $C_{DEC}$ and $C_{ACC}$. The values of PSi and Ci are previously stored in ECU 20.

ECU 20 applies to the above equation the coefficients PSi, Ci which are determined at proper different values according to the kinds of open loop control to be carried out, to calculate by the above equation the position PSi($P_A$) for the pulse motor 13 to be set at a required kind of open loop control and moves the pulse motor 13 to the calculated position PSi($P_A$), as will be described in detail hereinlater.

By correcting the air/fuel ratio during open loop control in response to the actual atmospheric pressure in the above-mentioned manner, it is possible to obtain not only conventionally known effects such as best driveability and prevention of burning of the ignition plug in an engine cylinder, but also optimum emission characteristics by setting the value of Ci at a suitable value, since the pulse motor position held during open loop control forms an initial position upon entering subsequent closed loop control.

Control of Shot Air Valve

The shot air valve 40 is temporarily held inoperative at the start of the engine by means of the solenoid valve 48 for prevention of misfire in an engine cylinder due to sudden dilution of the suction mixture with air, as previously mentioned.

This shot air valve 40 is kept inoperative for a predetermined period of time $t_{SA}$ (e.g., 5 seconds) after first firing of the engine. It is judged that first firing of the engine occurs when the engine rpm Ne increases across the predetermined value $N_{CR}$. This predetermined value $N_{CR}$ is set at a value higher than the cranking rpm of the engine but lower tan the idling rpm of the engine, as previously mentioned. ECU 20 contains a timer for performing five second counting. When the rpm Ne detected by the rpm sensor 35, 36 increases across the predetermined value $N_{CR}$, the above timer starts counting, and during five second counting by the timer after the start of the counting operation, the solenoid valve 48 is continuously operated by ECU 20 to keep the shot air valve 40 inoperative.

Figure 2:
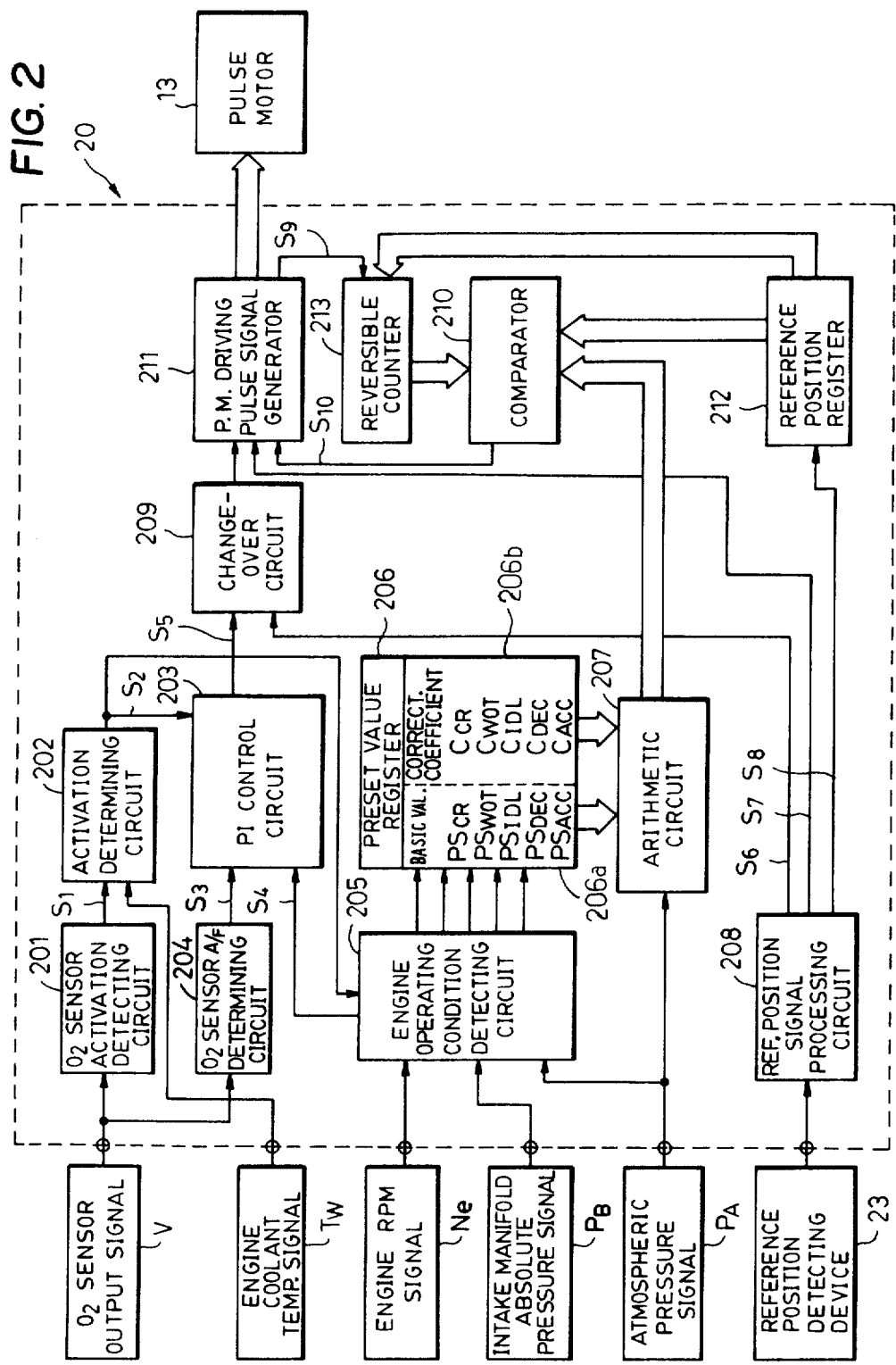
FIG. 2 is a block diagram illustrating the interior construction of the electronic control unit shown in FIG. 1.

FIG. 2 is a block diagram illustrating the interior construction of ECU 20 used in the air/fuel ratio control system having the above-mentioned functions according to the invention. In ECU 20, reference numeral 201 designates a circuit for detecting the activation of the $O_2$ sensor 28, which is supplied at its input with an output voltage V from the $O_2$ sensor. Upon passage of the predetermined period of time $t_x$ after the voltage of the above output voltage V has dropped below the predetermined value Vx, the above circuit 201 supplies an activation signal $S_1$ to an activation determining circuit 202. This activation determining circuit 202 is also supplied at its input with an engine coolant temperature signal Tw from the thermistor 33 in FIG. 1. When supplied with both the above activation signal $S_1$ and the coolant temperature signal Tw indicative of a value exceeding the predetermined value Twx, the activation determining circuit 202 supplies an air/fuel ratio control initiation signal $S_2$ to a PI control circuit 203 to render same ready to operate. Reference numeral 204 represents an air/fuel ratio determining circuit which determines the value of air/fuel ratio of engine exhaust gases, depending upon whether or not the output voltage of the $O_2$ sensor is larger than the predetermined value Vref, to supply a binary signal $S_3$ indicative of the value of air/fuel ratio thus obtained, to the PI control circuit 203. On the other hand, an engine operating condition detecting circuit 205 is provided in ECU 20, which is supplied with an engine rpm signal Ne from the engine rpm sensor 35, 36, an absolute pressure signal $P_B$ from the pressure sensor 31, an atmospheric pressure signal $P_A$ from the atmospheric pressure sensor 29, all the sensors being shown in FIG. 1, and the above control initiation signal $S_2$ from the activation determining circuit 202 in FIG. 2, respectively. The circuit 205 supplies a control signal $S_4$ indicative of a value corresponding to the values of the above input signals to the PI control circuit 203. The PI control circuit 203 accordingly supplies to a change-over circuit 209 to be referred to later a pulse motor control signal $S_5$ having a value corresponding to the air/fuel ratio signal $S_3$ from the air/fuel ratio determining circuit 204 and a signal component corresponding to the engine rpm Ne in the control signal $S_4$ supplied from the engine operating condition detecting circuit 205.

The engine operating condition detecting circuit 205 also supplies to the PI control circuit 203 the above control signal $S_4$ *containing a signal component corresponding to the engine rpm Ne, the absolute pressure $P_B$* in the intake manifold, atmospheric pressure $P_A$ and the value of air/fuel ratio control initiation signal $S_2$. When supplied with the above signal component from the engine operating condition detecting circuit 205, the PI control circuit 203 interrupts its own operation. Upon interruption of the supply of the above signal component to the control circuit 203, a pulse signal $S_5$ is outputted from the circuit 203 to the change-over circuit 209, which signal starts air/fuel ratio control with integral term correction.

On the other hand, a preset value register 206 is provided in ECU 20, which is formed of a basic value register section 206a in which are stored the basic values of preset values $PS_{CR}$, $PS_{WOT}$, $PS_{IDL}$, $PS_{DEC}$ and $PS_{ACC}$ for the pulse motor position, applicable to various engine conditions, and a correcting coefficient register section 206b in which are stored atmospheric pressure correcting coefficients $C_{CR}$, $C_{WOT}$, $C_{IDL}$, $C_{DEC}$ and $C_{ACC}$ for these basic values. The engine operating condition detecting circuit 205 detects the operating condition of the engine based upon the activation of the $O_2$ sensor and the values of engine rpm Ne, intake manifold absolute pressure $P_B$ and atmospheric pressure $P_A$ to read from the register 206 the basic value of a preset value corresponding to the detected operating condition of the engine and its corresponding correcting coefficient and apply same to an arithmetic circuit 207. The arithmetic circuit 207 performs arithmetic operation responsive to the value of the atmospheric pressure signal $P_A$, using the equation $PSi(P_A) = PSi + (760 - P_A) \times Ci$. The resulting preset value is applied to a comparator 210.

The engine operating condition detecting circuit 205 is also connected to the solenoid 48c of the solenoid valve 48 by way of a timer circuit C and a solenoid valve driving device D, both hereinlater referred to.

On the other hand, a reference position signal processing circuit 208 is provided in ECU 20, which is responsive to the output signal of the reference position detecting device (reed switch) 23, indicative of the switching of same, to produce a binary signal $S_6$ having a certain level from the start of the engine until it is detected that the pulse motor reaches the reference position. This binary signal $S_6$ is supplied to the change-over circuit 209 which in turn keeps the control signal $S_5$ from being transmitted from the PI control circuit 203 to a pulse motor driving signal generator 211 as long as it is supplied with this binary signal $S_6$, thus avoiding the interference of the operation of setting the pulse motor to the initial position with the operation of P-term/I-term control. The reference position signal processing circuit 208 also produces a pulse signal $S_7$ in response to the output signal of the reference position detecting device 23, which signal causes the pulse motor 13 to be driven in the stop-increasing direction or in the step-decreasing direction so as to detect the reference position of the pulse motor 13. This signal $S_7$ *is supplied directly to the pulse motor driving signal generator 211 to cause same to drive the pulse motor 13 until the reference position is detected. The reference position signal processing circuit 208 produces another pulse signal* $S_8$ each time the reference position is detected. This pulse signal $S_8$ is supplied to a reference position register 212 in which the value of the reference position (e.g., 50 steps) is stored. This register 212 is responsive to the above signal $S_8$ to apply its stored value to one input terminal of the comparator 210 and to the input of a reversible counter 213. The reversible counter 213 is also supplied with an output pulse signal $S_9$ produced by the pulse motor driving signal generator 211 to count the pulses of the signal $S_9$ corresponding to the actual position of the pulse motor 13. When supplied with the stored value from the refernce position register 212, the counter 213 has its counted value replaced by the value of the reference position of the pulse motor.

The counted value thus renewed is applied to the other input terminal of the comparator 210. Since the comparator 210 has its other input terminal supplied with the same pulse motor reference position value, as noted above, no output signal is supplied from the comparator 210 to the pulse motor driving signal generator 211 to thereby hold the pulse motor at the reference position with certainty. Subsequently, when the $O_2$ sensor 28 remains deactivated, an atmospheric pressure-compensated preset value $PS_{CR}(P_A)$ is outputted from the arithmetic circuit 207 to the one input terminal of the comparator 210 which in turn supplies an output signal $S_{10}$ corresponding to the difference between the preset value $PS_{CR}(P_A)$ and a counted value supplied from the reversible counter 213, to the pulse motor driving signal generator 211, to thereby achieve accurate control of the position of the pulse motor 13. Also, when the other open loop control conditions are detected by the engine condition detecting circuit 205, similar operation to that just mentioned above are carried out.

Figure 3:
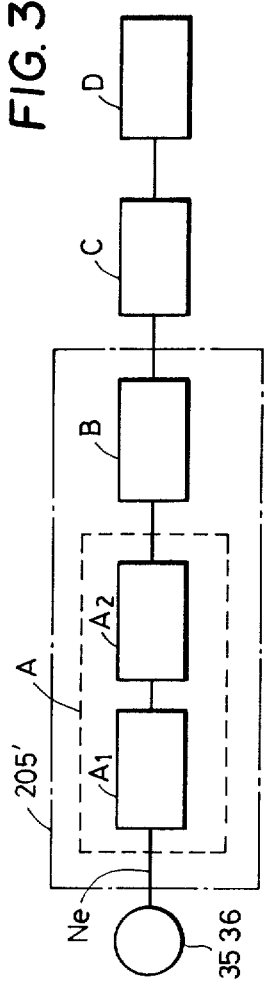
FIG. 3 is a block diagram illustrating a device provided within the electronic control unit in FIG. 1 for controlling the secondary air control valve in FIG. 1.

Referring next to FIG. 3, there is shown a block diagram of a control device provided within ECU 20 appearing in FIGS. 1 and 2, for controlling the shot air valve 40. Reference numeral 205' designates part of the engine operating condition detecting circuit 205 in FIG. 2, which is comprised of an engine rpm detecting circuit A and a comparator B. The comparator B is connected at its output to the input of a timer circuit C which in turn has its output connected to the input of a solenoid valve driving device D. The driving device D has its output connected to the solenoid 48c of the solenoid valve 48 in FIG. 1. The engine rpm detecting circuit A is formed of a waveform shaper section $A_1$ and a frequency-to-voltage converter section (hereinafter called "F-V converter") $A_2$. The waveform shaper section $A_1$ is connected to the engine rpm sensor 35, 36 in FIG. 1.

The engine rpm signal Ne, which is outputted in the form of pulses from the engine rpm sensor 35, 36, is shaped into a waveform having a uniform pulse shape at the waveform shaper section $A_1$ and then converted into a corresponding direct current voltage at the F-V converter $A_2$. This direct current voltage is compared with a reference voltage corresponding to the predetermined engine rpm $N_{CR}$ by the comparator B. The comparator B produces an output signal when the actual engine rpm Ne crosses the predetermined engine rpm $N_{CR}$ during the course of increasing from a lower engine rpm, that is, when the direct current voltage corresponding to the actual engine rpm Ne increases across the reference voltage corresponding to the predetermined engine rpm $N_{CR}$. The above output signal of the comparator B is applied to the timer circuit C. Responsive to this output signal, the timer circuit C produces an output signal for the predetermined period of time $t_{SA}$ (e.g., five seconds) after it has been supplied with the output signal from the comparator B. The output signal of the timer circuit C is supplied to the solenoid valve driving device D which in turn operates on this output signal to open the solenoid valve 48 to hold the shot air valve 40 inoperative. When the above predetermined period of time $t_{S4}$ passes, the timer circuit C stops producing its output signal so that the shot air valve 40 is rendered operative to initiate its normal operation.

Figure 4:
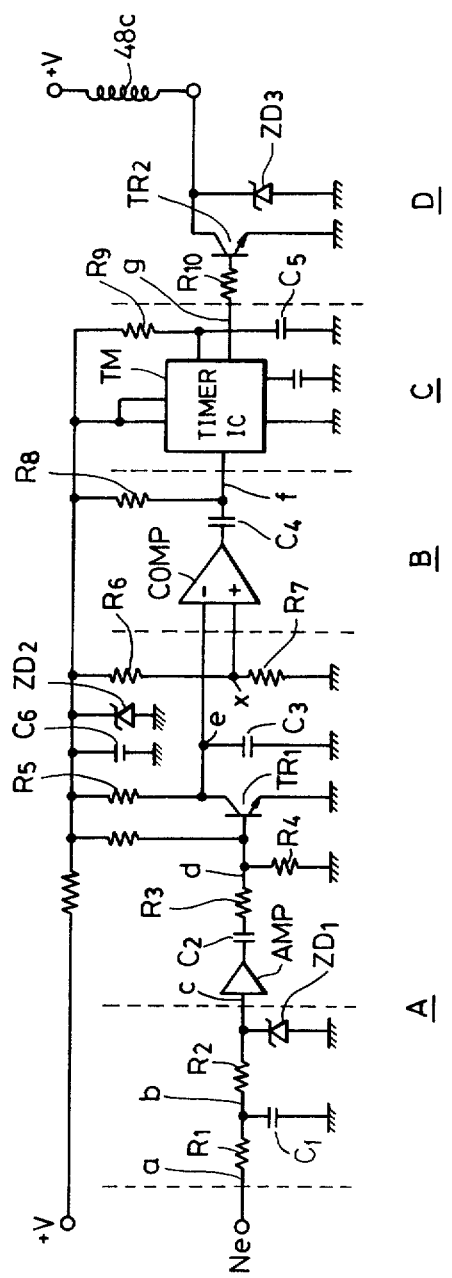
FIG. 4 is a circuit diagram illustrating an electrical circuit embodying the device of FIG. 3.

FIG. 4 illustrates an electrical circuit embodying the control device of FIG. 3. In the engine rpm detecting circuit A, an RC filter formed of a resistance $R_1$ and a capacitor $C_1$ is connected to an amplifier AMP by way of a current limiting resistance $R_2$. A Zener diode $ZD_1$ is connected between the input terminal of the amplifier AMP and the ground. Connected to the output of the amplifier AMP is a differentiating circuit formed of a capacitor $C_2$ and resistances $R_3$, $R_4$, which is, on the other hand, connected to the base of an NPN transistor $TR_1$. This transistor $TR_1$ has its emitter grounded and its collector connected to the junction of a resistance $R_5$ with a capacitor $C_3$, the resistance $R_5$ and the capacitor $C_3$ forming an integration circuit. Also connected to the collector of the transistor $TR_1$ is the inverting input terminal of a comparator COMP which forms the comparator B in FIG. 3. This comparator COMP has its non-inverting input terminal connected to the junction of a resistance $R_6$ with a resistance $R_7$ for providing a reference voltage. The comparator COMP has its output terminal connected to the input of a timer circuit TM, which is formed of an integrated circuit, and which forms the timer circuit C in FIG. 3, by way of a capacitor $C_4$. A resistance $R_8$ is connected between the capacitor $C_4$ and a positive voltage power supply, which resistance cooperates with the capacitor $C_4$ to form a differentiating circuit. A resistance $R_9$ and a capacitor $C_5$ are connected to the timer circuit TM, the time constant of which determines the operating time of the timer circuit TM.

The timer circuit TM has its output connected to the base of an NPN transistor $TR_2$ by way of a current limiting resistance $R_{10}$. This transistor $TR_2$ has its emitter grounded and its collector connected to the solenoid 48c of the solenoid valve 48 in FIG. 1.

Incidentally, in FIG. 4, symbols $C_6$ and $ZD_2$ represent a capacitor and a Zener diode, respectively, which cooperate to drop the power supply voltage to a suitable value. Reference numeral $ZD_3$ designates a Zener diode for preventing damage to the transistor $TR_2$ due to a counter electromotive voltage produced upon deenergization of the solenoid 48c.

Figure 5:
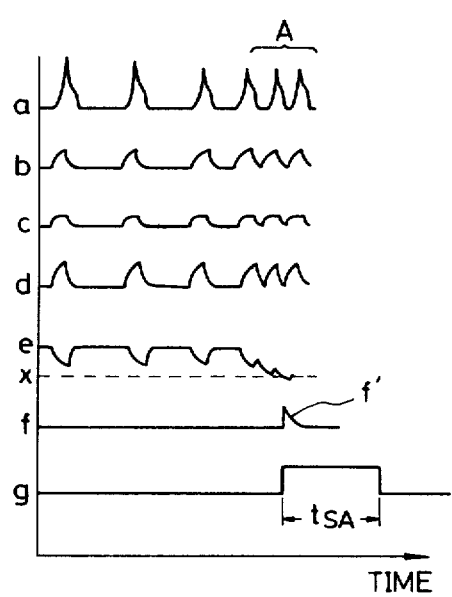
FIG. 5 is a graph showing waveforms available at several portions of the electrical circuit of FIG. 4.

The operation of the circuit of FIG. 4 will now be described. The RC filter $R_1$, $C_1$ is supplied with the engine rpm signal Ne from the rpm sensor 35, 36 in FIG. 1. The signal Ne originally has a pulse waveform as shown at a in FIG. 5. It is shaped into a waveform as shown at b in the same figure by means of the RC filter and then into a waveform having a uniform crest value as shown at c by means of the Zener diode $ZD_1$. The pulse having the waveform shown at c are then amplified by the amplifier AMP, followed by shaping into a waveform as shown at d in FIG. 5 by means of the differentiating circuit $C_2$, $R_3$. The shaped pulses are applied to the transistor $TR_1$. Upon application of each of the pulses shown at d to the transistor $TR_1$, it turns on to cause a drop in the potential at the junction of the resistance $R_5$ and capacitor $C_3$ of the integration circuit as shown at e in FIG. 5. With this arrangement, when the engine rpm Ne increases across the predetermined rpm $N_{CR}$ as plotted at A in FIG. 5, the frequency of conduction of the transistor $TR_1$ increases so that the capacitor $C_3$ is discharged at an increased rate, with the result that the potential at point e in FIG. 4 drops below the potential x at the junction of the resistance $R_6$ with the resistance $R_7$, which corresponds to the reference voltage. Accordingly, the output of the comparator COMP goes to a high level so that the differentiating circuit $C_4$, $R_8$ produces a pulse f' (at f in FIG. 5). The timer circuit TM is triggered by this pulse f' to produce a high output voltage for the predetermined period of time $t_{S4}$ after the application of the pulse f' thereto (at g in FIG. 5) so that the transistor $TR_2$ conducts to energize the solenoid 48c of the solenoid valve 48 to hold the shot air valve 40 inoperative. Upon the lapse of the predetermined period of time $t_{S4}$, the output of the timer circuit TM turns low to deenergize the solenoid 48c so that the shot air valve 40 is again rendered operative.

As set forth above, according to the air/fuel ratio control system of the invention, the secondary air control valve which supplies secondary air into the intake pipe of the engine is held inoperative by means of the solenoid valve over a predetermined period of time after the engine rpm increases across a predetermined rpm at the start of the engine, and after the lapse of the above predetermined period of time the secondary air control valve is allowed to resume its normal operation. Therefore, it is feasible to prevent without fail misfire in an engine cylinder which is caused by temporary dilution of the suction mixture at the start of the engine. By initiating secondary air supply into the intake pipe after the start of the engine, explosive combustion of unburned fuel in the exhaust system can be prevented.

What is claimed is:

1. In an air/fuel ratio control system for performing feedback control of the air/fuel ratio of an air/fuel mixture being supplied to an internal combustion engine having an intake pipe, the system including:

means for detecting the concentration of an exhaust gas ingredient emitted from said engine, fuel quantity adjusting means for producing said mixture being supplied to said engine, and an electrical circuit operatively connecting said concentration detecting means with said fuel quantity adjusting means in a manner effecting feedback control operation to control the air/fuel ratio of said mixture to a predetermined value in response to an output signal produced by said concentration detecting means, said electrical circuit including a circuit for detecting the operating condition of said engine, the combination which comprises:

a secondary air supply passage communicating said intake pipe of said engine with atmospheric air;

a secondary air control valve arranged across said secondary air supply passage and having a diaphragm defining a negative pressure chamber on one side thereof and a control chamber on an opposite side thereof, said secondary air control valve being responsive to negative pressure introduced into said negative pressure chamber to open said secondary air supply passage;

orifice means communicating said negative pressure chamber with said control chamber;

a check valve arranged to allow movement of air only from said negative pressure chamber to said control chamber;

a negative pressure passage communicating said negative pressure chamber with said intake pipe of said engine;

a control passage communicating said control chamber with said intake pipe to substantially instantaneously render said secondary air control valve inoperative by equalizing the pressures within the chambers thereof;

a solenoid valve arranged to close said control passage;

a sensor for detecting the rotational speed of said engine;

solenoid valve control means for controlling said solenoid valve in response to an output signal produced by said engine rotational speed sensor;

said solenoid valve control means including said engine operating condition detecting circuit, said engine operating condition detecting circuit being arranged to be supplied with said output signal of said engine rotational speed sensor for control of the air/fuel ratio of said mixture;

said solenoid valve control means being operable to open said solenoid valve for a predetermined period of time after the rotational speed of said engine has increased across a predetermined value which is higher than the cranking speed of said engine but lower than the idling speed of said engine, whereby said secondary air control valve is substantially instantaneously completely closed for said predetermined period of time upon opening of said solenoid valve.

2. The air/fuel ratio control system as claimed in claim 1, wherein said solenoid valve control means further includes: a circuit for shaping said output signal of said engine rotational speed sensor into a predetermined waveform and converting said output signal thus shaped into a corresponding direct current voltage; a comparator for comparing said direct current voltage with a predetermined reference voltage corresponding to said predetermined value of said engine rotational speed and producing an output when said direct current voltage increases across said predetermined reference voltage; said shaping and converting circuit and said comparator forming part of said engine operating condition detecting circuit; a timer responsive to said output of said comparator to produce an output for a predetermined period of time; and means responsive to said output of said timer to actuate said solenoid valve into a closed position thereof.

* * * * *